US00RE36105E

United States Patent [19]

Newman

[11] E Patent Number: Re. 36,105

[45] Reissued Date of Patent: Feb. 23, 1999

[54] WATER PIPE

[76] Inventor: Mark R. Newman, P.O. Box 17009, Tucson, Ariz. 85731

[21] Appl. No.: 51,333

[22] Filed: Feb. 20, 1996

Related U.S. Patent Documents

Reissue of:

[64] Patent No.: Des. 355,728
Issued: Feb. 21, 1995
Appl. No.: 14,262
Filed: Oct. 18, 1993

[51] LOC (6) Cl. ..... 27-02

[52] U.S. Cl. ..... D27/162

[58] Field of Search ..... D27/162; 131/173, 131/330

[56] References Cited

U.S. PATENT DOCUMENTS

| | | | |
|---|---|---|---|
| D. 243,256 | 2/1977 | Grihalva | D27/162 |
| D. 246,389 | 11/1977 | Graham | D27/162 |
| D. 256,507 | 8/1980 | Graham | D27/162 |
| D. 355,728 | 2/1995 | Newman | D27/162 |
| 4,108,152 | 8/1978 | Kahler | 131/173 |
| 4,142,536 | 3/1979 | DeCarlo | 131/173 |
| 4,148,327 | 4/1979 | Graham | 131/173 |
| 4,244,383 | 1/1981 | Kahler | 131/180 |

*Primary Examiner*—Susan J. Lucas
*Assistant Examiner*—Jennifer Rivard
*Attorney, Agent, or Firm*—LaRiviere, Grubman & Payne, LLP

[57] CLAIM

The ornamental design for a water pipe, as shown and described.

DESCRIPTION

1 Claim, 3 Drawing Sheets

Figure 1:
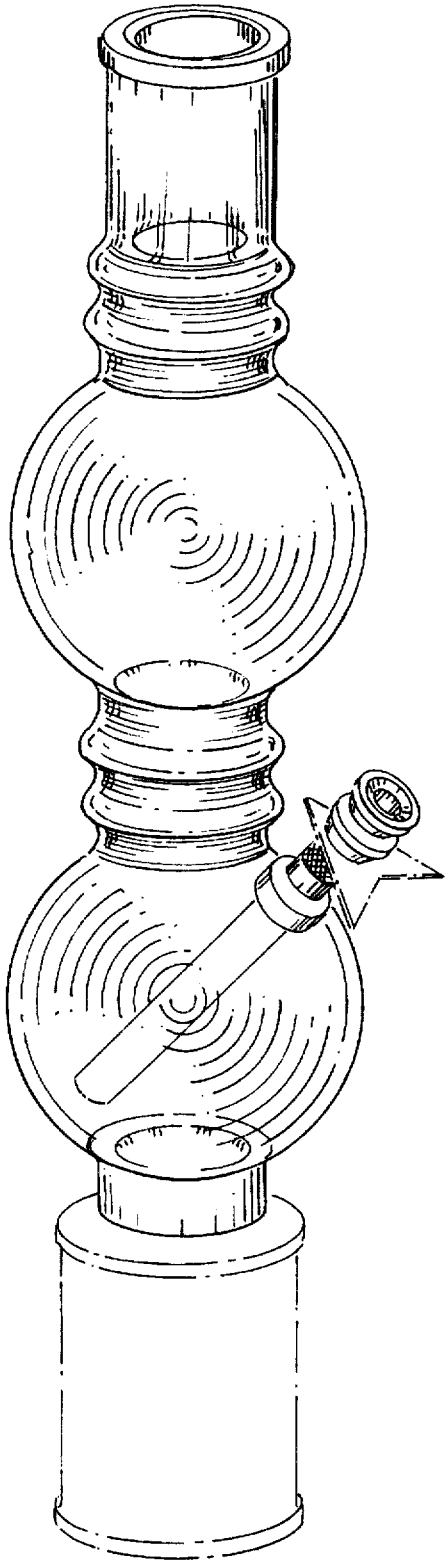
FIG. 1 is a perspective view of a water pipe showning my design, *the broken lines are for purposes of illustration only and form no part of the invention*.
Figure 2:
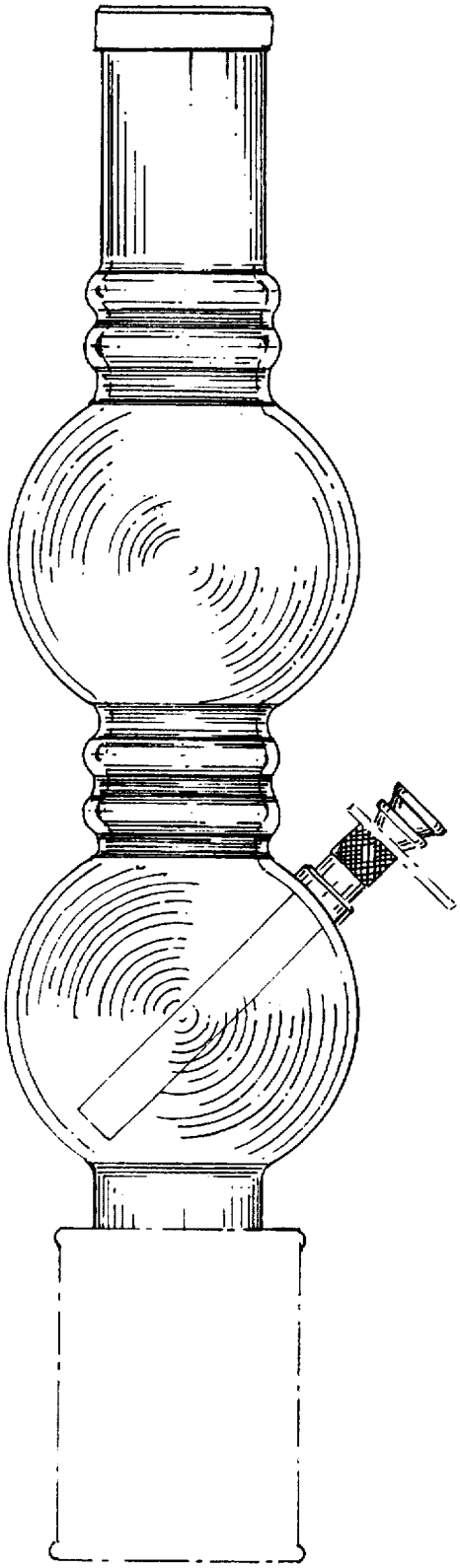
FIG. 2 is a side elevational view, the opposite side being a mirror image thereof, *the broken lines are for purposes of illustration only and form no part of the invention*.
Figure 3:
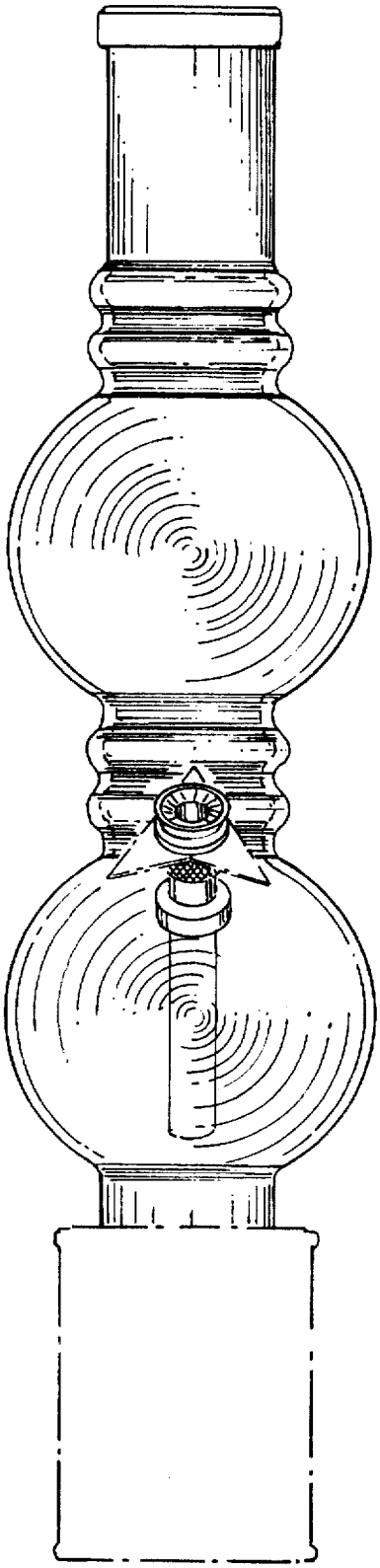
FIG. 3 is a front elevational view thereof, *the broken lines are for purposes of illustration only and form no part of the invention*.
Figure 4:
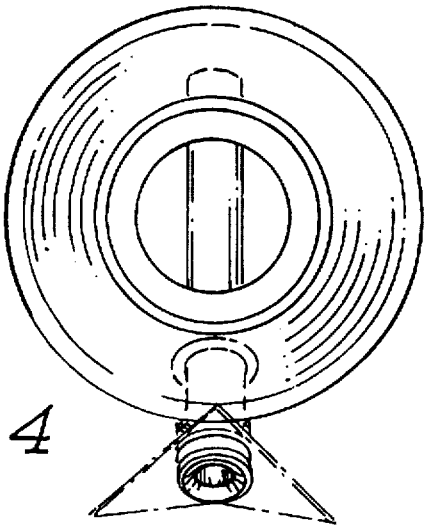
FIG. 4 is a top plan view thereof, *the broken lines are for purposes of illustration only and form no part of the invention*; and, FIG. 5 is a bottom plan view thereof, *the broken lines are for purposes of illustration only and form no part of the invention.*
Figure 5:
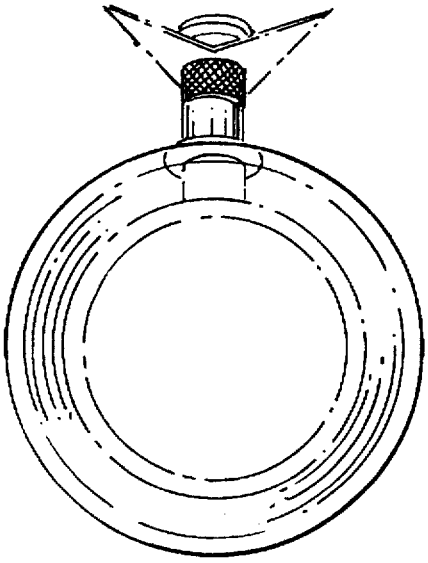

Matter enclosed in heavy brackets [ ] appears in the original patent, but forms no part of this reissue; matter printed in italics indicates the additions made by reissue.